United States Patent [19]
Meyer

[11] Patent Number: 4,846,889
[45] Date of Patent: Jul. 11, 1989

[54] POLYMERIC BLEND USEFUL IN THIN-BED MORTAR COMPOSITIONS COMPRISING A WATER-SOLUBLE CELLULOSE ETHER AND A WATER-INSOLUBLE, BUT WATER-DISPERSIBLE POLYMER

[75] Inventor: Wilfred C. Meyer, Midland, Mich.

[73] Assignee: The Dow Chemical Company, Midland, Mich.

[21] Appl. No.: 151,340

[22] Filed: Feb. 2, 1988

[51] Int. Cl.[4] .......... C04B 24/34; C08L 1/26

[52] U.S. Cl. .......... 106/115; 106/181; 106/314; 106/315; 524/2; 524/5; 524/43; 524/44

[58] Field of Search .......... 106/181, 93, 115, 314, 106/315, 197.1; 524/43, 42, 44, 2, 5

[56] References Cited

U.S. PATENT DOCUMENTS

| | | | |
|---|---|---|---|
| 2,868,753 | 1/1959 | Morgan | 524/5 |
| 4,021,257 | 5/1977 | Bernett | 106/90 |
| 4,222,920 | 9/1980 | Crisp | 524/5 |
| 4,487,864 | 12/1984 | Bermudez | 524/2 |
| 4,594,108 | 6/1986 | Greminger | 106/197.1 |
| 4,596,838 | 6/1986 | Andreichuk | 524/5 |

*Primary Examiner*—Theodore Morris

[57] ABSTRACT

This invention is a polymer blend useful in thin-bed mortar compositions comprising a water-soluble cellulose ether and a water-insoluble, but water-dispersible, polymer. The water insoluble, but water-dispersible polymer can include an unneutralized polyacrylic acid that is lightly crosslinked or methylcellulose with a viscosity from about 50 cps to about 150,000 cps, provided the polymeric blend containing methylcellulose is employed in a medium that has a pH of about 12 or greater, although a pH of less than 12 is workable, but is dependent upon the methoxyl content of the methylcellulose. The polymeric blend extends the working time of the composition in which it is employed and because the blend has sag binding characteristics, it also functions as a sag resistance aid.

19 Claims, No Drawings

POLYMERIC BLEND USEFUL IN THIN-BED MORTAR COMPOSITIONS COMPRISING A WATER-SOLUBLE CELLULOSE ETHER AND A WATER-INSOLUBLE, BUT WATER-DISPERSIBLE POLYMER

BACKGROUND OF THE INVENTION

Many adhesives and cementitious compositions such as construction mortars, concretes and plasters are typically formulated with a water-retention aid to improve the characteristics thereof. By employing a water-retention aid, water loss is prevented and the rheological properties are improved. Typically, water-retention aids are used in ceramic tile adhesive compositions to prevent water absorption by the ceramic tile or substrate to which the tile is applied.

To be functional in the construction industry, a ceramic tile composition must be easily spreadable and in conjunction the composition must support the tile during the period in which the composition sets. Typically, a thin-bed mortar composition used to set ceramic tile with a preference for thin bed motors contains: sand, cement, and cellulose ethers. It is known that cellulose ethers extend the working time of the thin-bed composition, acting as a water-retention aid.

Unfortunately, cellulose ethers do not contribute to sag resistance, or resistance to movement of the tile that is applied to the thin-bed mortar composition in a vertical surface. However, as disclosed in Bermudez. U.S. Pat. No. 4,487,864, when cellulose ethers are crosslinked to form a modified water-soluble carbohydrate, the carbohydrate is useful as a water-retention aid and as an adhesive.

Another method of controlling sagging is disclosed in Bernett, U.S. Pat. No. 4,021,257. Bernett discloses the use of long chain organic polymers which function as flocculants, aiding in sag resistance. In practice, typically, the most operable compositions are mixtures of clays with cellulose ethers and polyacrylamide flocculants, but these are costly and have handling disadvantages.

Thus, it would be highly desirable to have a composition which has all three properties - good rheology, good bond characteristics, has water-retention properties, and can be used efficiently without cost and handling disadvantages.

SUMMARY OF THE INVENTION

This invention is a polymer blend useful in thin-bed mortar compositions comprising a water-soluble cellulose ether and a water-insoluble, but water-dispersible polymer. The water-insoluble, but water dispersible polymer can include an unneutralized polyacrylic acid that is lightly crosslinked, or methylcellulose.

Generally, this polymeric blend can be used in ceramic tile mortars, cementitious compositions, wall-finishing compounds, cement plasters, and in tape joint compounds. The polymeric blend extends the working time of the composition, since the blend has water retention properties. Thus, the composition, e.g., mortar composition, is easy to use and thin-bed adhesives are possible. By using a water-insoluble, but water-dispersible polymer in the polymeric blend, the blend has strong binding characteristics and it also functions as a sag resistance aid.

DETAILED DESCRIPTION OF THE INVENTION

This invention is a polymeric blend useful in thin-bed mortar compositions comprising a water-soluble cellulose ether and a water-insoluble, but water-dispersible polymer.

By "water-insoluble, but water-dispersible" is meant that the polymer can be water-swellable, due to the level of or type of substitution and is dependent upon the pH of the medium in which the polymer is employed. Typically, the polymer will function as water-swellable in a pH of around 12, but the pH is not a limiting factor. The polymer will absorb at least 50, preferably 2,000 grams (g) of water per gram of polymer. In addition, the water-insoluble, but water-dispersible polymer can include certain cellulose ethers that are water-swellable, or a crosslinked polymer such as a polyacrylic acid, which is also water-swellable due to the crosslinking.

To function as a water-insoluble, but water-dispersible polymer, the crosslinked polymer must be insoluble in water and be unneutralized, even though in the process of utilizing the blend in mortar compositons and the like, the acid does become neutralized. For example, acrylic acid in the acid form rather than in the salt form can be employed as the water-dispersible polymer. Thus, water-dispersible polymers can include crosslinked polymers such as polyacrylic acids or water-swellable polymers such as certain cellulose ethers.

The water-insoluble, but water-dispersible cellulose ether is inherently water-swellable and can include a methylcellulose. The water-swellability is the greatest at a pH of 12 or greaer, although the water-insoluble, but water-dispersible cellulose ether can be water-swellable at a pH below 12 depending upon the methoxyl content. Additionally, the water-swellable cellulose ether at a pH below or above 12 has a methoxyl content from about 10 to about 25 weight percent, preferably from about 18 weight percent to about 23 weight percent; and has a hydroxypropyl content from about 0 weight percent to about 6 weight percent, preferably from about 0 weight percent to about 4 weight percent. Most preferably, the hydroxypropyl group is not present and only the methoxyl group is present at a concentration of about 18 weight percent to about 23 weight percent.

At a pH below 12, the cellulose ether has a viscosity from about 50 to about 50,000 cps. Preferably, the cellulose ether has a viscosity from about 100 to about 40,000 cps, and most preferably from about 500 to about 30,000 cps as a 2 weight percent solution in water at 20° C. In a pH of 12 or greater, the cellulose ether swells much more than at a pH below 12, and the viscosity of the cellulose ether is from about 500 cps to about 150,000 cps. Preferably, the cellulose ether has a viscosity from about 1,000 to about 100,000 and most preferably from about 2,000 to about 50,000 centipoises as a 2 weight percent solution in water at 20° C.

The polyacrylic acid usable in the present invention has a pH less than 7 and is comprised of a copolymer of a vinyl acrylic acid monomer that contains from about 0.05 percent to about 2 percent crosslinking agent. The vinyl acrylic acid monomer can include acrylic acids, methylacrylic acids, or copolymers of such, and the crosslinking agent can include trimethyolpropane triacrylate. Standard polymerization techniques known in the art may be used to crosslink the monomer as the polymer is prepared. Typically, a 0.10 to 0.50 percent of the crosslinking agent is combined with the crosslinkable monomer. The monomer must be crosslinked, forming a polyacrylic acid, before employing the polyacrylic acid in mortars, cement plasters and the like.

In addition, the water-swellable polymer must be non-flocculating, meaning a material that does not induce agglomeration of particles present in cementitiuous compositions, mortars, adhesives and the like. Flocculation is determined by a method described in U.S. Pat. No. 4,021,257 and is incorporated herein by reference in its entirety. According to the procedures described in U.S. Pat. No. 4,021,257, column 5, a polymer is non-flocculating if its flocculation index is greater than 0.50, preferably 0.60, more preferably 0.70. The water-swellable cellulose ethers used herein have a flocculation index of 0.78 and the polyacrylic acid has a flocculation index of 0.65; therefore, both are non-flocculants.

The water-soluble cellulose ether can be selected from hydroxypropyl methylcellulose, methylcellulose, ethylhydroxyethylcellulose, hydroxyethylmethylcellulose, or hydroxyethylcellulose, with a viscosity from about 2,000 to about 100,000, preferably from about 4,000 to about 50,000. A suitable water-soluble methoxyl content is from 16 weight percent to about 32 weight percent, preferably from about 19 weight percent to about 24 weight percent and the hydroxypropyl content is from about 4 weight percent to about 32 weight percent, preferably from about 7 weight percent to about 12 weight percent.

The polymeric blend may be employed in various ratios to impart the desired rheological properties. Generally, from about 3 to 1 to about 1 to 3 by weight, respectively, water-soluble cellulose ether to water-insoluble, but water-dispersible cellulose ether is operable, and the preferable ratio is from about 2:1 to about 1:2 by weight of the water-soluble cellulose ether to water-insoluble, but water-dispersible cellulose ether. Most preferably, the ratio of water-soluble polymer to water-insoluble, but water-dispersible polymer is about 1:1. Generally, the polymeric blend is preblended as a dry powdery mix in the said ratios. The polymeric blend may be added to other ingredients commonly used in forming cementitious or adhesive compositions and the like. However, all the ingredients can be added simultaneously forming the desired composition.

Commonly, the polymeric blend can be employed in ceramic tile mortars, in mortar compositions, wall-finishing compounds, crack fillers, cement plasters, and in tape joint compounds. As used herein, cementitious compositions refer to hydraulic cement and cement is meant to include materials which in admixture with water form a hydrate. Common cements can include alumina cement, Portland cement, and gypsum.

These thin-bed mortars and cementitious compositions must have strong bonding characteristics known as sag resistance, and additionally, must have water-retention properties to ensure suitable rheology of the composition. Typically, these water-soluble/water-insoluble, but water-dispersible thickener blends constitute from about 0.2 weight percent to about 1.0 weight percent of the mortar cementitious composition. Preferably, the thickener blend makes up from about 0.4 weight percent to about 0.7 weight percent thereof.

In particular, a typical ceramic tile adhesive composition comprises from about 2 weight percent to about 97 weight percent Portland cement, from about 0 to about 75 weight percent filler and from about 0.2 weight percent to about 2 weight percent water-soluble/water-swellable polymeric blend. The inert filler is optional, but if desired can include sand limestone, silica, or most any other inert particulate inorganic material.

Also of interest are cementitious compositions, cement plasters of stucco compositions. Cementitious or stucco compositions can comprise from about 50 to about 80 weight percent Portland cement, from about 20 to about 50 weight percent sand or other filler, and from about 0.2 to about 0.5 weight percent water-soluble/water-insoluble polymeric blend based on cement. Optionally, surfactants may be added to improve rheology characteristics.

When preparing a gypsum-plaster composition, the composition is similar to the cementitious compositions except about 3 to 4 weight percent of the composition is limestone and about 0.2 weight percent is the water-soluble/water-insoluble polymeric blend. Whereas, when preparing a ceramic tile adhesive composition, the composition is similar to the cementitious composition except 0.5 weight percent of the water-soluble, water-insoluble polymeric blend is used based on cement.

Additionally, the amount of water used with the composition will depend somewhat in the particular use and desired consistency for which the composition is to be employed.

EXAMPLES

These mixtures are non-flocculating, meaning a material which does not substantially induce agglomeration of particles. A method for determining flocculation activity (flocculation index) is the test described in U.S. Pat. No. 4,021,257, which is incorporate herein by reference in its entirety. Water-insoluble, but water-dispersible organic polymers having a flocculation index, as measured by the said test, of greater than 0.50, may be considered non-flocculants for the purpose of this invention. Polyacrylic acid gives a flocculation index of 0.65 and the methylcellulose used in the said invention gives a flocculation index of 0.78. Thus, the water-insoluble, but water-dispersible polymers used herein as non-flocculating.

The examples in Tables I and II are prepared in the following manner:

Dry Ingredients:

A dry-set cement mortar composition is prepared by blending the ingredients as follows:

50.0 percent graded Ottowa Sand 49.5 percent Portland Cement 0.5 percent total amount of water-soluble/water-swellable polymeric blend*

(*the ratio of water-soluble and water-swellable polymer is specified in Table I)

Water Ratio:

To ensure proper consistency for spreading, 22.0 g of water are added to 100 g of the dry cement blend.

Mixing Mortar:

The mixing operation of mortar with water should be performed slowly until uniform mixing is achieved, and then vigorously, for proper air entrainment and consistency. The mixing operation should be performed 5 to 6 minutes after the initial water addition. Shake for 30 minutes and remix before using.

THICKENER SYSTEM IN TABLE I - varying ratios of the hydroxypropyl methylcellulose and polyacrylic acid in the blend to show the effects thereof.

1. The thickening system comprises hydroxypropyl methylcellulose and polyacrylic acid (Carbopol® 934, available from the B. F. Goodrich Company). The water-soluble cellulose ether has a viscosity of 5,337 cps as a 2 percent solution and a methoxyl content of 22.1 weight percent with a hydroxypropyl content of 8.1 weight percent to about 12 weight percent. The polyacrylic acid is Carbopol® 934 and has a viscosity of about 416,000 cps at 0.5 percent solids using a Brookfield RVT Viscometer with a number 5 spindle at 2.5 rpm.

2. The same as in 1, except the ratio of water-soluble cellulose ether to water-insoluble, but water-dispensible polymer is 1.7:1.
3. The same as in 1, except the ratio of water-soluble cellulose ether to water-insoluble, but water-dispersible polymer is 1:1.
4. The same as in 1, except the ratio of water-soluble cellulose ether to water-insoluble, but water-dispersible polymer is 1:3.

THICKENER SYSTEM IN TABLE II - varying the methoxyl content of the water-dispersible methylcellulose, but also altering the water-soluble polymer.

5. The thickening system comprises: hydroxypropyl methylcellulose and methylcellulose. The water-soluble cellulose ether, hydroxypropyl methylcellulose has a viscosity of 5337 cps as a 2 percent solution and has a methoxyl content of 22.1 weight percent with a hydroxypropyl content of 8.1 weight percent. The water-insoluble, but water-dispersible polymer, methylcellulose, has a viscosity of 2,500 cps as a 2 percent solution and has a methoxyl content of 16.7 weight percent with no hydroxypropyl percent.
6. The water-soluble cellulose ether has a methoxyl content of 31.4 weight percent with no hydroxypropyl present, and has a viscosity of 3,949 cps as a 2 percent solution. The water-insoluble, but water-dispersible polymer, methylcellulose, has a methoxyl content of 22.5 weight percent with no hydroxypropyl present and has a viscosity of 7.500 cps as a 2 weight percent solution.
7. The same as in 6, except that the water-dispersible cellulose ether contains 16.7 weight percent methoxyl with no hydroxypropyl present, and has a viscosity of 2,500 cps as a 2 percent solution.
8. The same as in 6, except that the water-dispersible methylcellulose has a methoxyl content of 16.8 weight percent with no hydroxypropyl present and the methylcellulose has a viscosity of 300 cps as a 2 weight percent solution.

The Examples Have the Following Qualities:

The compositions in Tables I and II have good rheology and when applied to tiles, there is excellent support; thus the composition has good bonding characteristics. In addition, the compositions retain water sufficiently to allow the mixture to have extended working time.

CONTROLS

A. The control comprises an unneutralized polyacrylic acid Carbapol® 934 with a viscosity of 416,000, at 0.5 percent solids using a Brookfield RVT Viscometer with a number 5 spindle at 25 rpm as a 0.5 weight percent solution. The control has no water retention properties and has extremely poor workability properties.

B. The control comprises hydroxypropyl methylcellulose with a viscosity of 5,337 cps as a 2 percent solution. The hydroxypropyl methylcellulose has a methoxyl content of 22.1 weight percent and a hydroxypropyl content of 8.1 weight percent.

TABLE I

| Sample No. | Thickener System: Water-Soluble Cellulose Ether | Thickener System: Water-Insoluble, but Water-Dispersible, Polymer | Ratio of Water-Soluble Cellulose Ether to Water-Insoluble, but Water-Dispersible, Polymer | Sag Resistance Value** (mm) |
|---|---|---|---|---|
| 1 | Hydroxypropyl methylcellulose | Polyacrylic acid | 3:1 | 10.0 |
| 2 | Hydroxypropyl methylcellulose | Polyacrylic acid | 1.7:1 | 3.0 |
| 3 | Hydroxypropyl methylcellulose | Polyacrylic acid | 1:1 | 2.0 |
| 4 | Hydroxypropyl methylcellulose | Polyacrylic acid | 1:3 | 0 |
| A | 0 | *polyacrylic acid | 0:1 | N/A |

*Control - See before this table
**See after table II

TABLE II

| Sample No. | Thickener System: Water-Soluble Cellulose Ether | Thickener System: Water-Insoluble, but Water-Dispersible Polymer | Ratio of Water-Soluble Cellulose Ether to Water-Insoluble, but Water-Dispersible Polymer | Sag Resistance Value** (mm) |
|---|---|---|---|---|
| 5* | Hydroxypropyl methylcellulose | methylcellulose | 1:1 | 1.5 |
| 6 | Hydroxypropyl methylcellulose | methylcellulose | 1:1 | 1.0 |
| 7 | Hydroxypropyl methylcellulose | methylcellulose | 1:1 | 0 |
| 8 | Hydroxypropyl methylcellulose | methylcellulose | 1:1 | 3.0 |

TABLE II-continued

| Sample No. | Thickener System: Water-Soluble Cellulose Ether | Thickener System: Water-Insoluble, but Water-Dispersible Polymer | Ratio of Water-Soluble Cellulose Ether to Water-Insoluble, but Water-Dispersible Polymer | Sag Resistance Value** (mm) |
|---|---|---|---|---|
| B | *Hydroxypropyl methylcellulose | N/A | N/A | off the block |

*Control - See before Table I
**See after this Table

**Sag-Resistance Value

Sag resistance is measured by applying the sample mortar onto a concrete block using a square and thick glass template. The mortar should be screened using cuts in a right-to-left direction and then in similar cuts a left-to-right direction. Remove the glass from the mortar and center a tile in a mortar pad with the ribs in a vertical position. Then place the tile application jig into the tile. A 130 g weight is dropped from a height of 4 inches in four positions in the tile. The tile application jig is removed and the position of the tile is marked. The assembly is positioned so that the tile and mortar are in a vertical plane. After 1 hour, the sag is measured at all four corners of the tile. the "sag value" is the average of all four measurements.

What is claimed is:

1. A modified thin bed mortar composition comprising from about 25 to about 97 weight percent Portland cement, from 0 to about 75 weight percent filler, and about 0.2 to about 2 weight percent of a blend of a water-soluble cellulose ether polymer that has a viscosity from about 2,000 to about 100,000 cps and a water-insoluble, but water dispersible polymer that is selected from the group consisting of a cellulose ether and an unneutralized polyacrylic acid, whereby the sag resistance of the mortar compositon is increased over the same mortar composition containing either a water-soluble cellulose ether or a water-insoluble, but water dispersible polymer.

2. The composition in claim 1 wherein the water-insoluble, but water-dispersible polymer is a cellulose ether.

3. The composition in claim 2 wherein the cellulose ether is methylcellulose.

4. The composition in claim 2 wherein the methylcellulose has a viscosity from about 100 to about 150,000.

5. The composition in claim 2 wherein the methoxyl content is about 10 weight percent to about 25 weight percent and the hydroxypropyl content is about 0 weight percent to about 4 weight percent.

6. The composition in claim 2 wherein the methoxyl content is about 18 weight percent to about 23 weight percent and the hydroxypropyl is not present in the cellulose ether.

7. The composition of claim 1 wherein the water-insoluble, but water-dispersible polymer is an unneutralized polyacrylic acid.

8. The composition in claim 7 wherein the unneutralized polyacrylic acid polymer comprises a copolymer of a crosslinkable monomer and from about 0.05 percent to about 2 percent crosslinking agent.

9. The composition in claim 1 wherein the water-soluble cellulose ether is selected from the group consisting of hydroxypropyl methylcellulose, methylcellulose, ethylhydroxyethylcellulose, hydroxyethylmethylcellulose and hydroxyethylcellulose.

10. The composition in claim 9 wherein the methoxyl content of the cellulose ether is from about 16 weight percent to about 32 weight percent and the hydroxypropyl content is about 4 weight percent to about 32 weight percent.

11. The composition in claim 9 wherein the methoxyl content of the cellulose ether is from about 19 weight percent to about 24 weight percent and the hydroxypropyl content is about 7 weight percent to about 12 weight percent.

12. The composition in claim 11 wherein the ratio of water-soluble polymer to water-insoluble, but water-dispersible polymer is from about 3:1 to about 1:3.

13. The composition in claim 12 wherein the ratio of water-soluble polymer to water-insoluble, but water-dispersible polymer is from about 2:1 to about 1:2.

14. The composition in claim 13 wherein the ratio of the water-soluble polymer to water-insoluble, but water-dispersible polymer is about 1:1.

15. The composition of claim 1 wherein the filler is selected from the group consisting of sand, limestone, talc and mica.

16. The modified thin-bed mortar composition of claim 1 in a ceramic tile adhesive.

17. The modified thin-bed mortar composition of claim 1 in a gypsum plaster composition.

18. The modified thin-bed mortar composition of claim 1 in stucco composition.

19. The modified thin-bed mortar composition of claim 7 in a concrete composition.

* * * * *

UNITED STATES PATENT AND TRADEMARK OFFICE
CERTIFICATE OF CORRECTION

PATENT NO. : 4,846,889

DATED : July 11, 1989

INVENTOR(S) : Wilfred C. Meyer

It is certified that error appears in the above-identified patent and that said Letters Patent is hereby corrected as shown below:

Column 1, line 24, "motors" should correctly appear --mortars--;

Column 3, lines 8-9, "cementitiuous" should correctly appear --cementitious--;

Column 4, line 36, "incorporate" should correctly appear --incorporated--;

Column 6, line 7, "7.500" should correctly appear --7,500--;

Column 8, line 15, "of" should correctly appear --in--;

Column 8, line 37, "claim 11" should correctly appear --claim 1--.

Signed and Sealed this

Twelfth Day of February, 1991

*Attest:*

HARRY F. MANBECK, JR.

*Attesting Officer* *Commissioner of Patents and Trademarks*